United States Patent [19]

Boruschewitz et al.

[11] 4,446,722

[45] May 8, 1984

[54] VIBRATION SENSOR, PARTICULARLY KNOCK SENSOR FOR INTERNAL COMBUSTION ENGINES

[75] Inventors: Manfred Boruschewitz; Hansjoachim Hamisch, both of Berlin, Fed. Rep. of Germany

[73] Assignee: Robert Bosch GmbH, Stuttgart, Fed. Rep. of Germany

[21] Appl. No.: 390,171

[22] Filed: Jun. 21, 1982

[30] Foreign Application Priority Data

Jul. 7, 1981 [DE] Fed. Rep. of Germany ....... 3126676

[51] Int. Cl.$^3$ .............................................. G01L 23/22
[52] U.S. Cl. ........................................ 73/35; 73/654; 310/329
[58] Field of Search .......................... 73/35, 651, 654; 310/329, 330, 321, 323

[56] References Cited

U.S. PATENT DOCUMENTS 4,379,404  4/1983  Hamisch et al. ...................... 73/651

*Primary Examiner*—James J. Gill
*Attorney, Agent, or Firm*—Frishauf, Holtz, Goodman & Woodward

[57] ABSTRACT

To facilitate manufacture and assembly of a vibration sensor, particularly to sense knocking vibrations or incipient knocking in an internal conbustion (IC) engine, piezoelectric elements are secured to the machine or cylinder or a cylinder head bolt, the vibration of which is to be sensed, and a flexing strip is resiliently engaged with a surface of the piezoelectric element or elements, and arranged transverse to the direction of vibration of the machine or IC engine. In a preferred form, the piezoelectric element can be a tubular structure (FIG. 4: 19) located in a cross bore (16) of a cylinder head bolt, the free swinging flexing element (21) being positioned within the hollow portion of the tubular piezoelectric element and pressed against an outer end face by a spring engaging laterally projecting wings (22) secured to the flexing strip.

11 Claims, 5 Drawing Figures

VIBRATION SENSOR, PARTICULARLY KNOCK SENSOR FOR INTERNAL COMBUSTION ENGINES

Reference to related application, assigned to the assignee of this application, the disclosure of which is hereby incorporated by reference:

U.S. Ser. No. 236,907, filed Feb. 23, 1981, HAMISCH et al now U.S. Pat. No. 4,379,404, Apr. 13, 1983.

The present invention relates to a vibration or oscillation sensor, and more particularly to a sensor to determine knocking or incipient knocking conditions in internal combustion engines.

BACKGROUND

The referenced application Ser. No. 236,907, filed Feb. 23, 1981, HAMISCH et al., now U.S. Pat. No. 4,379,404 assigned to the assignee of this application describes a sensor in which oscillations which occur upon knocking of an internal combustion (IC) engine can be determined, by use of a piezoelectric element which is coupled to a flexing-type material which transfers flexoral forces, occurring upon vibration, to piezoelectric transducers. The flexing-types transducer has one end connected to the piezoelectric element and is connected thereto with the IC engine. It is elongated transverse to the direction of vibration of the part of the IC engine, the vibration of which is to be sensed and thus arranged to flee in the direction of vibration.

It is comparatively difficult to make transducers of this type, and particularly to make the connection between the flexing element and the piezoelectric transducer element.

THE INVENTION

It is an object to improve the vibration sensor described in the aforementioned referenced application to permit easy manufacture and ready assembly thereof, and especially to provide a transducer which can readily be associated with an internal combustion engine.

Briefly, a clamping means is provided which clamps one end portion, elastically, of the flexing element in vibration or oscillation-transmitting contact with the piezoelectric element, which forms a clamping back-up for the flexing element, and is, in turn, secured in vibration-transmitting contact with the body, the vibration of which is to be sensed, for example a portion of the cylinder head, or a cylinder head bolt of an internal combustion (IC) engine.

In accordance with a preferred form of the invention, the piezoelectric element is a tubular structure, introduced into a transverse bore formed in the head of a cylinder bolt, the flexing element being a strip which is restrained at one end and clamped by a pair of wing-like lateral projections, resiliently, against facing end portions of the tubular piezoelectric element. For compact construction, the flexing end is in form of a strip which extends within the tubular element, so that the overall length of the unit can be small and fit within the space available in a cross bore formed in the bolt head of a cylinder bolt.

The sensor has the advantage that it can be made quickly, while providing output signals of suitable level for evaluation electronic circuitry.

DRAWINGS

For a complete discussion of vibration sensors of the type to which the present invention relates, reference is made to the application Ser. No. 236,907, filed Feb. 23, 1981, HAMISCH et al., the disclosure of which is incorporated by reference.

Figure 1:
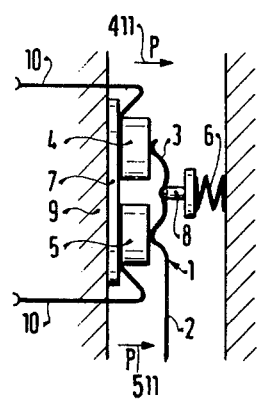
FIG. 1 is a highly schematic cross-sectional view through a sensing arrangement to sense vibration of a body.

The sensor of FIG. 1 comprises a flexing element 1 which has a free cantilevered end portion 2 and a clamping or connection portion 3. The portion 2 is free to vibrate or oscillate. The clamping portion 3 is clamped by a clamping arrangement against a pair of piezoelectric elements 4, 5. The clamping portion 3 is, in cross section, wave-formed or undulating. A valley or tough of the wave is engaged with a facing end of the piezoelectric elements 4 and another trough with element 5. The strip 2, which may be a flat strip, thus has essentially line contact with the piezoelectric elements 4, 5 at the respective valley zones of the end portion 3. The clamping arrangement provides for resilient clamping pressure; a spring 6 presses an engagement part 8, in engagement with the flexing strip 1, against the piezoelectric elements 4, 5 which, in turn, are resiliently maintained in clamping pressure against the element 1 by a back-up insulating plate 7, which is in vibration-transmitting contact with the body 9, the vibration of which is to be sensed. The body 9, for example, may be the cylinder head or a cylinder wall portion of an IC engine.

Spring 6 presses the insulating element 8 against the pressure or clamping portion 3 of the flexing strip 1 which, in turn, presses the piezoelectric elements 4, 5 via the insulating plate 7 against the machine portion or engine portion 9. The machine portion 9 and the sensor are rigidly connected, and must transfer the vibrations from the machine portion, or, in case of an IC engine, knocking sounds or vibrations, in order to be able to determine knocking or incipient knocking upon occurrence of vibration. The strip 1 is so positioned that it can oscillate or vibrate in the direction of vibration of the part 9 of the machine or engine, of which the vibration or knocking is to be sensed.

Operation:

Upon oscillation of the strip element 1, due to flexing thereof, the piezoelectric elements 4, 5 are elastically deformed at the pressure lines thereof. Electrical connections 10, connected to the piezoelectric elements, will then provide an electrical signal which is representative of the transverse forces applied to the piezoelectric elements 4, 5. The piezoelectric elements are electrically connected together by the elastic strip 1, which is metallic. The electrical connection 10 then will have a signal appear thereon which is the sum of the voltages measured by the two elements 4, 5. The polarization direction P of the elements 4, 5 is shown by the arrows 411, 511, respectively. Since the polarization direction of the elements 4, 5 is equal, a voltage will occur only when the mechanical loading on the two elements is in opposite directions, that is, if the resilient strip 1 is flexing.

Figure 4:
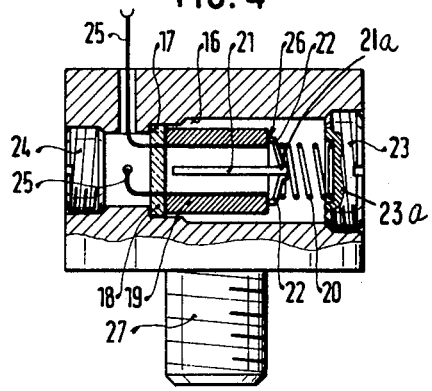
FIG. 4 is a longitudinal sectional view through a sensor fitted in a cross bore formed in a cylinder bolt head.

FIG. 4—to be described below—illustrates an arrangement in which a piezoelectric element 19, in tubular form, is excited upon flexing of a flexing element 21 located within the cylindrical bore, and pressed against end faces thereof, the entire structure being positioned in a transverse bore of a cylinder head bolt. The counter surface for the spring 20, which corresponds to spring 6 of FIG. 1, is a screw 23a fitted in a tapped bore portion 23 of the cross bore in the bolt.

Figure 2:
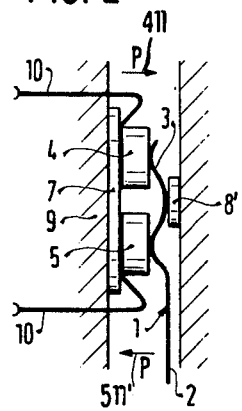
FIG. 2 is a view similar to FIG. 1, showing an alternative embodiment.

FIG. 2 illustrates an arrangement in which two piezoelectric elements 4, 5 are provided positioned in opposite directions of polarization, as indicated by arrows 411 and 511'. The flexing element 1 has an engagement portion 3' which is constructed that it simultaneously forms the resilient clamping spring. The separate spring 6 thus is no longer needed. The pressure portion 3 is constructed in undulating form, with bends in different direction. Two bends, extending in the same direction, have engagement lines pressing against the piezo-electric elements 4, 5. An insulating disk 8' is engaged with the undulating portion bent in the direction opposite the engagement lines.

Operation, embodiment of FIG. 2:

The basic operation is identical to that described in connection with FIG. 1. Since the polarization directions P of the two piezoelectric elements 4, 5 are opposite, a voltage will appear on the connecting lines 10 only when the loading on the two elements is in the same direction, which will be the case upon flexing of the element 1, due to the relative vibration between the element 1 and the base or support 9.

Figure 3:
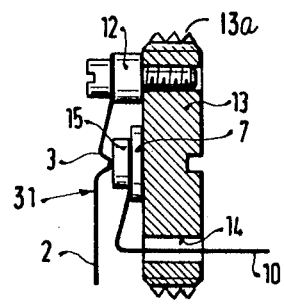
FIG. 3 is a part-longitudinal sectional view illustrating another arrangement in which the sensor is located against the face of a nut head.

Embodiment of FIG. 3:

The sensor can be simplified by use of only a single piezoelectric element 15. The end of the clamping portion 3 is securely clamped to the base support, the vibration of which is to be sensed, by a screw 12. Screw 12, thus, retains the flexing element 31 in position and, simultaneously, provides for resilient clamping pressure of the element 31 against the piezoelectric element 15. To increase the engagement pressure, the flexing element 31, in strip form, is formed with a bump or depression line at the engagement area thereof with respect to the piezoelectric element 15. The sensor is positioned on a plate or base support 13, for example a bolt head or the like, which is formed with an opening 14 therethrough to provide for attachment to a connecting line 10. The element 13 can be screwed, for example, in a tapped bore of a machine part, or in a space formed within a bolt head itself by outer threads 13a thereon.

The output signal in the embodiments of FIGS. 1, 2 and 3 is derived from the connections 10 which are electrically connected to one side of the piezoelectric element 15 which, for example, may be in plate or button form, and has a conductive surface formed thereon, for example by vapor deposition of a conductive layer, or application of a metallic surface thereon.

The flexing strip 1, 31 can be made as a single element, for example punched and deformed, or pressed to suitable shape in one operation from spring steel or the like.

Embodiment of FIG. 4:

The sensor is secured in a cross bore of a cylinder head bolt 27 of an IC engine. The cylinder bolt 27 has a cross bore 16, formed with a shoulder 17 therein. An insulating plate 18, and forming a counter element or clamping jaw, is fitted against the shoulder 17, to receive the counter clamping pressure of a tubular piezoelectric element 19. The piezoelectric element 19 has a slightly smaller diameter than the diameter of the cross bore 16 near the shoulder. The piezoelectric element is pressed against the the plate 18 by a spring 20. A flexing strip oscillating element 21 is interposed between the spring 20 and element 19. The flexing strip 21 is widened at its retained end portion 26 to form an engagement zone and clamping jaw against the piezoelectric element. The portion 26 is physically formed by two angled strips 22 of sheet metal, between which the flexing strip 21 is secured, as shown at 21a, for example by a weld connection.

The element can be made extremely short, by fitting the flexing strip within the opening of the tubular piezoelectric element 19, as seen in FIG. 4. The counter surface for spring 20 is formed by a screw 23a screwed into the tapped end of the cross bore 16 of the head of the bolt 27. The opposite side of the cross bore is closed off by a screw 24 to prevent contamination and ingress of dirt. The connecting lines 25 are brought out by suitable openings formed in the head. One of the connections can be connected to the cylinder head screw itself to form a ground or chassis connection, the other being brought out by an insulated line through an opening in the cylinder head, if the electrode 28 is insulated against ground.

Figure 5:
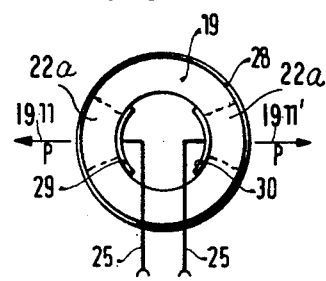
FIG. 5 is an end view of the sensor in the construction of FIG. 4.

The element 19 used in the sensor of FIG. 4 is shown in end view in FIG. 5. Contact layers 29, 30 are formed on the inside of the tubular element 19. The contact regions 29, 30 are located on those portions of the element 19 which are within the range of engagement of the angle strips 22, which can be termed wing-like extensions of the flexing element 21. The engagement surfaces of the wing-like extensions are shown in phantom representation at 22a in FIG. 5. The connecting lines 25 are electrically secured to the contact layers or surfaces 29, 30. A counter electrode 28 extends over the entire outer surface of the element 19, without subdivision. An insulating or protective jacket, for example of protective resilient material, such as plastic, can be placed over the electrically conductive coating 28 to prevent damage thereto upon external shocks.

FIG. 5 also shows the directions of polarization 1911, 1911' of the tubular piezoelectric element 19. The tubular piezoelectric element 19 can be a unitary structure with radial polarization.

Various changes and modifications may be made, and features described in connection with any one of the embodiments may be used with any of the others, within the scope of the inventive concept.

We claim:

1. Vibration sensor to sense vibration of a body (9, 13, 27), particularly to sense vibration due to knocking of an internal combustion engine, having
    a base (7, 17) secured to the body, the vibration of which is to be sensed;
    at least one piezoelecric element (4, 5, 15, 19) located in vibration-transmitting contact with said body;
    an elongated elastic element (1, 21, 31) having a free end portion (2) having elongated transverse to the direction of vibration of said body for free vibration in the direction of the body vibration and comprising resilient clamping means (6, 7, 8; 12; 20, 21a, 23a) for resiliently clamping one end portion of the elastic element in surface contact with the at least one piezoelectric element for vibratory or oscillatory transmitting contact with the at least one piezoelectric element;

wherein the said one end portion is wavy or undulating, and a valley or trough of the waves or undulations is in essentially line engagement with a surface of the piezoelement element;

and the clamping means comprise resilient engagement means of said wavy or undulating portion to provide for said elastic clamping engagement of said one end portion with respect to the piezoelectric element.

2. Sensor according to claim 1, wherein said elastic element comprises a unitary strip forming a punched and shaped elongated spring strip.

3. Sensor according to claim 1, wherein (FIG. 1) two piezoelectric elements are provided, positioned next to each other, and a spring (6) is provided forming said clamping means, pressing against a bulging portion of the undulating strip to press adjacent valley portions against both said piezoelectric elements.

4. Sensor according to claim 1, wherein the elastic element is a strip-like leaf spring, having an end portion bent in said wavy or undulating form to provide resiliently deflectable engagement lines or surfaces thereat.

5. Sensor according to claim 4, wherein said one end portion is formed with bends of different direction; two piezoelectric elements are provided, two bends of the same direction being in engagement with surfaces of said piezoelectric elements, and said clamping means ciomprises a clamping engagement surface (8') engaging the oppositely directed bend between said two adjacent bends of the same direction.

6. Sensor according to claim 1, wherein a terminal portion of said elastic element is fixedly secured to said body;

and an end portion adjacent the terminal portion is formed with an undulation or projection extending towards a surface of the piezoelectric element for resilient engagement therewith to form said wavy or undulating end portion.

7. Sensor according to claim 6, wherein said body comprises a removable screw head or nut (13).

8. Vibration sensor to sense vibration of a body (9, 13, 27), particularly to sense vibration due to knocking of an internal combustion engine, having a base (7, 17) secured to the body, the vibration of which is to be sensed;

at least one piezoelecric element (4, 5, 15, 19) located in vibration-transmitting contact with said body;

an elongated elastic element (1, 21, 31) having a free end portion (2) having elongated transverse to the direction of vibration of said body for free vibration in the direction of the body vibration and comprising resilient clamping means (6, 7, 8; 12; 20, 21a, 23a) for resiliently clamping one end portion of the elastic element in surface contact with the at least one piezoelectric element for vibratory or oscillatory transmitting contact with the at least one piezoelectric element;

wherein (FIGS. 4,5) said piezoelectric element comprises a tube (19) having a hollow center zone;

said elastic element (21) comprises a free-swinging strip, freely movable within said hollow center zone of the strip;

and said clamping means comprises laterally extended portions (22) secured to one end portion (26) of said resilient element (21), said clamping means including resilient means (20) pressing said laterally extending portions against an end face of said tubular piezoelectric element.

9. Sensor according to claim 8, wherein said laterally extending portion comprises wing strips (22), said freely swinging strip being secured to said wing strips;

and said resilient means comprises a spring bearing against said wing strips and pressing said wing strips against oppositely located end face portions (22a) of the tubular piezoelectric element.

10. Sensor according to claim 8, wherein said body comprises a cylinder head bolt (27) of an internal combustion engine;

said cylinder head bolt being formed with a cross bore (16) in which said tubular piezoelectric element is positioned, the end face of said tubular piezoelectric element opposite said laterally extending portions being seated in vibration-transmitting engagement in said cylinder head bolt;

and wherein said resilient means comprises a spring (20) and a counter nut (23a) secured in said cross bore, and pressing said laterally extending portions against said one end face of the tubular piezoelectric element.

11. Sensor according to claim 10, further including metallized zones (29, 30) formed on the inside surfaces of said tubular piezoelectric element, and connection means (25) extending from said metallized zones to provide output signals from said piezoelectric element upon relative vibration of the bolt (27) and the free swinging strip (21).

* * * * *